(12) United States Patent
Cieszynski et al.

(10) Patent No.: US 12,341,325 B2
(45) Date of Patent: Jun. 24, 2025

(54) WELD POSITIONING CLIP FOR ENCAPSULATION PROCESS

(71) Applicant: Aptiv Technologies AG, Schaffhausen (CH)

(72) Inventors: Michal Cieszynski, Cracow (PL); Tomasz Slizowski, Cracow (PL); Wojciech Lesniak, Cracow (PL); Szymon Bak, Cracow (PL); Marek Manterys, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 149 days.

(21) Appl. No.: 18/120,515

(22) Filed: Mar. 13, 2023

(65) Prior Publication Data
US 2023/0327413 A1    Oct. 12, 2023

(30) Foreign Application Priority Data
Apr. 6, 2022 (GB) ..................................... 2205033

(51) Int. Cl.
*H02G 1/14* (2006.01)
*H02G 15/08* (2006.01)

(52) U.S. Cl.
CPC ............. *H02G 1/145* (2013.01); *H02G 15/08* (2013.01)

(58) Field of Classification Search
None
See application file for complete search history.

(56) References Cited

U.S. PATENT DOCUMENTS

| | | | | |
|---|---|---|---|---|
| 3,691,505 A | * | 9/1972 | Graves | H02G 15/1806 219/541 |
| 3,770,876 A | * | 11/1973 | Post | H02G 1/14 29/460 |
| 3,885,087 A | * | 5/1975 | Takada | H02G 15/003 174/76 |
| 4,203,000 A | * | 5/1980 | Muller | B29C 61/0608 174/92 |

(Continued)

FOREIGN PATENT DOCUMENTS

| | | |
|---|---|---|
| GB | 2263589 A | 7/1993 |
| JP | H0322374 A | 1/1991 |

(Continued)

OTHER PUBLICATIONS

Search Report; Applicaiton GB2205033.0; dated Sep. 6, 2022, 2 pages.

*Primary Examiner* — Krystal Robinson
(74) *Attorney, Agent, or Firm* — Billion & Armitage (57) ABSTRACT

A cable clip for engaging around an exposed conducting core of a cable during an encapsulation process. The clip is formed as a rectilinear loop having an inner surface and an outer surface and opposed ends which define an opening in the loop therebetween by means of which the clip can be engaged around the exposed core. The clip has posts distributed around, and extending outwardly from, its outer surface. The posts engage with an inner surface in an encapsulation mold enclosed around the clip so as to maintain a minimum spacing between the mold and the outer surface of the body around the entire clip and thereby ensure a minimum thickness of encapsulation sealant is formed around the exposed core of the cable during the encapsulation process.

15 Claims, 5 Drawing Sheets

(56) References Cited

U.S. PATENT DOCUMENTS

| | | | | |
|---|---|---|---|---|
| 4,366,011 A | * | 12/1982 | Nolf | H02G 15/1806 |
| | | | | 174/DIG. 8 |
| 10,655,374 B2 | * | 5/2020 | Fukumoto | F16L 3/237 |
| 2007/0137888 A1 | * | 6/2007 | Takahashi | H05K 3/301 |
| | | | | 174/260 |
| 2012/0103650 A1 | * | 5/2012 | Genco | H01R 43/005 |
| | | | | 174/93 |
| 2013/0240684 A1 | * | 9/2013 | Meyers | H02G 3/32 |
| | | | | 248/74.1 |
| 2014/0338953 A1 | * | 11/2014 | Seraj | H01R 43/26 |
| | | | | 174/138 F |
| 2018/0076603 A1 | * | 3/2018 | Harwath | H01B 7/361 |
| 2018/0209147 A1 | * | 7/2018 | Dian | E04C 5/162 |
| 2020/0303841 A1 | * | 9/2020 | Doring | H02G 15/105 |
| 2023/0084894 A1 | * | 3/2023 | Tanaka | B60R 16/0215 |
| | | | | 174/72 A |

FOREIGN PATENT DOCUMENTS

| | | | | |
|---|---|---|---|---|
| JP | 10199593 A | * | 7/1998 | |
| JP | H10199593 A | | 7/1998 | |
| JP | H10261444 A | | 9/1998 | |
| WO | WO-2007112230 A2 | * | 10/2007 | H02G 15/003 |

* cited by examiner

WELD POSITIONING CLIP FOR ENCAPSULATION PROCESS

CROSS-REFERENCE TO RELATED APPLICATION

This application claims benefit of priority to United Kingdom Patent Application No. GB 2205033.0 filed on Apr. 6, 2022, the entire disclosure of which is hereby incorporated by reference.

TECHNICAL FIELD OF THE INVENTION

The present disclosure relates to improvements in relation to retaining exposed cable joints in position in a mold during an encapsulation process.

BACKGROUND

It is commonplace in a number of different technological areas to include a cable management feature such as a join, splice, split or the like on cables, which have a protective outer sheath to protect an inner core. For example, electrical cables will usually have an insulating coating or sheath on them to prevent unwanted electrical contact between the conducting core of the cable and the surroundings. In order, then, to perform, for example, a splicing of the cables, a section of the insulating sleeve is removed from the conductor of the main cable in the area in which the splice is to be performed as well as from the end of the conductor of the joining cable so that the conducting cores of the two cables can be brought into electrical contact and joined together by e.g., ultrasonic welding, crimping, soldering, or another method. Once the splicing operation has been completed, it is necessary to restore an insulating coating around the spliced cable cores to protect against unwanted electrical contact at the site of the splice. This is achieved by enclosing the splice in a mold and then injecting polymeric sealant, for example an insulating encapsulation sealant into the mold so that it surrounds the splice. Once the encapsulation sealant is cured, the mold is removed leaving the hardened material forming a protective coating around the splice.

During the encapsulation process, it is, however, important that sufficient thickness of the encapsulation sealant is formed all around the splice to provide the necessary insulation of the cores completely around the splice, and one of the problems which occurs is that the position of the splice in the mold can be difficult to control. Incorrect splice position within the mold can give rise to a huge risk of the splice being closer to one side of the mold resulting in insufficient thickness of insulation being produced on that side of the splice.

Hitherto, the only way to solve this issue was to design the mold with an oversized cavity around the splice area to minimize the risk of insufficient encapsulation material thickness in critical areas, but this results in an oversized join which can cause packaging issues in applications where space is limited, such as automotive applications, and be problematic to fit through smaller areas through which the cables need to be fed. This solution also still does not guarantee minimum wall thickness all around the splice keeping the optimized design.

SUMMARY

According to a first aspect of the present disclosure, there is provided a positioning clip for engaging around an exposed conducting core of a cable during an encapsulation process, the clip comprising a body in the form of a loop having opposed ends which define an opening in the loop therebetween by mean of which, in use, the clip can be engaged around the exposed core, the body comprising at least one post extending outwardly from an outer surface of the body, the post, in use, engaging with an inner surface if an encapsulation mold enclosed around the clip so as to maintain a minimum spacing between the mold and the outer surface of the body at least in the region of the post and thereby ensure a minimum thickness of encapsulation sealant is formed around the exposed core of the cable during the encapsulation process.

A positioning clip in accordance with the present disclosure has the advantage that the at least one post ensures adequate spacing between the clip body, and hence the portion of the cable enclosed therein, and the encapsulation mold to ensure an adequate thickness of encapsulation sealant is formed around the exposed core during the encapsulation operation whilst still allowing space for the encapsulation sealant to flow around the clip and hence the exposed core.

The term loop used to describe the shape of the body of the clip is not intended to be limited to any particular cross sectional shape of the clip but instead is used to define the annular nature of the body, which may have a variety of shapes including, but not limited to, a generally open circular cross section, a C shaped cross section, an open oval cross section, and a generally squared or a generally rectangular cross section, in each case the loop having the opening therein defined between the neighboring ends.

The clip may be used in conjunction with encapsulation of any exposed cable portion, such as a splice in a cable where two or more cables are merged together, a split in a cable, a cable join or any other cable management formation which requires encapsulation with sealing function.

The clip is preferably made of an insulation material so as to be suitable for use with a cable having a conducting core.

The clip may be resiliently deformable such that the opposed ends of the body of the clip may be resiliently deformed to widen the opening to enable, in use, the cable core to be engaged within the clip. Preferably, however, the opening is sized to allow, in use, the clip to be engaged around the cable core without permanently deforming the body. The clip may include a closing member which is engageable between the opposed ends of the body of the clip to close the opening and thereby, in use, retain the cable core therein.

An inner surface of the clip is preferably corrugated so as to include a plurality of ridges interspaced between channels which each extend across the width of the clip. This has the advantage of providing spaces in the engagement between the clip and the cable core to allow encapsulation sealant to penetrate to and flow around the cable core, thereby avoiding air pockets from forming.

Preferably, the at least one post comprises a plurality of posts distributed around the clip so as to maintain a spacing between the mold and the body of the clip around the entire body. More particularly, the clip preferably includes at least three posts distributed about its outer periphery. A single post can be used in conjunction with a specially designed mold which interacts with the reduced number of posts in order to ensure positioning function.

The clip may be of arcuate cross-sectional shape, such as circular or oval. The clip may then include three posts equiangularly distributed about its outer periphery, which posts are all of equal length, and may optionally include additional posts spaced between the three equiangularly spaced posts which may be of different lengths.

Preferably, however, the clip is of generally rectilinear C-shaped cross-sectional shape, with the opening in the clip in particular being formed by one of the short sides of the rectilinear profile being absent. The at least one post then optionally comprises an outwardly extending post provided on each corner of the rectilinear shape, each the post preferably extending outwards along an axis which bisects the angle between the sides of the rectilinear profile which are adjacent to the corner. The posts on the corners are preferably of equal length. Alternatively, the at least one post comprises posts extending outwardly from each side of the clip, preferably from the middle of each side, rather than on each corner. In a particularly preferred embodiment, posts are provided on each corner with an additional post extending perpendicularly outwardly from the middle of each long side of the rectilinear profile. The additional posts may be of equal length to the corner posts but preferably are longer than the corner posts. It will of course be understood that the length, angle and position of the posts, as well as the number, may be varied within the scope of the present disclosure.

In a particularly preferred embodiment, each post optionally includes at least one radial flange. More preferably, the or each post includes radial flange formed at least one of part way along its length and on its projecting end. This has the advantage that any liquid, such as release liquid applied to the inside of the mold, which has contact with the posts, collects on and drips off an edge of the flanges away from the inside of the clip and also is not migrating closed to the core, thereby avoids the release liquid preventing proper bonding of encapsulation sealant around the clip. In a particularly preferred embodiment, the at least one radial flange on each post comprises a pair of radial flanges—a first one proximate the protruding end of the post and a second one spaced from the first towards the bottom of the post, in particular substantially central along the post.

The whole clip, including optional features, is preferably integrally formed such as by molding, e.g., injection molded.

According to another aspect of the present disclosure, there is providing a method of encapsulating a cable management feature of an exposed core of a cable, comprising engaging a clip according to the present disclosure around an exposed cable management feature, enclosing an encapsulation mold around the clip, inserting encapsulation sealant into the mold, allowing the encapsulation sealant to cure and removing the mold from around the encapsulated clip and cable management feature.

BRIEF DESCRIPTION OF THE DRAWINGS

The present invention is now described, by way of example with reference to the accompanying drawings, in which.

DETAILED DESCRIPTION

Referring first to FIGS. 1 to 5, there is shown a cable clip 1 according to an embodiment of the present disclosure. The clip 1 is of generally rectilinear profile having opposed long sides 2, 3 which are joined together at one end by a transverse side 4 but which define an opening 5 between the other ends by means of which the clip 1 can be engaged around a cable splice as shown, for example, in FIG. 6.

At least one post 6 extends outwardly from the outer surface 1a of the clip. More particularly, a post 6 may be formed on each of the four corners of the rectilinear form of the clip 1, each corner post extending at an angle of substantially 45 degrees to each of the adjoining sides so that the protruding ends 6a of the corners posts 6 define an envelope around the clip 1. Additionally, a post 6 extends outwardly from midway along each of the long sides 2, 3 of the clip 1 with these middle posts 6 being longer than the corner posts 6, as can clearly be seen in FIG. 1, so that the envelope around the clip 1 defined by the posts 6 is expanded around the middle of the long sides 2, 3.

Figures 1, 2, 3:
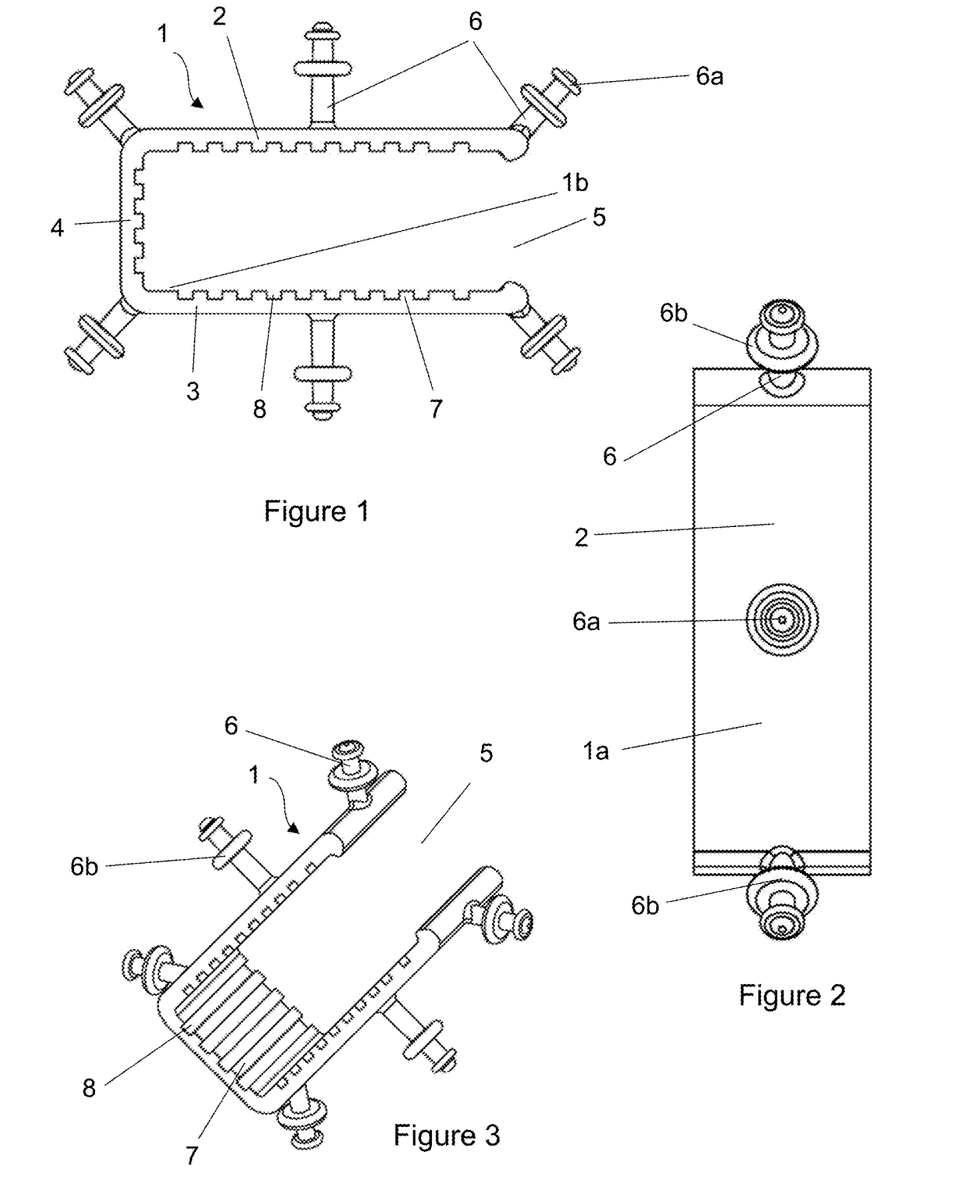
FIG. 1 is a side view of a cable clip according to some embodiments.
FIG. 2 is a top view of the cable clip of FIG. 1 according to some embodiments.
FIG. 3 is a first perspective view of the cable clip of FIG. 1 according to some embodiments.
Figure 4:
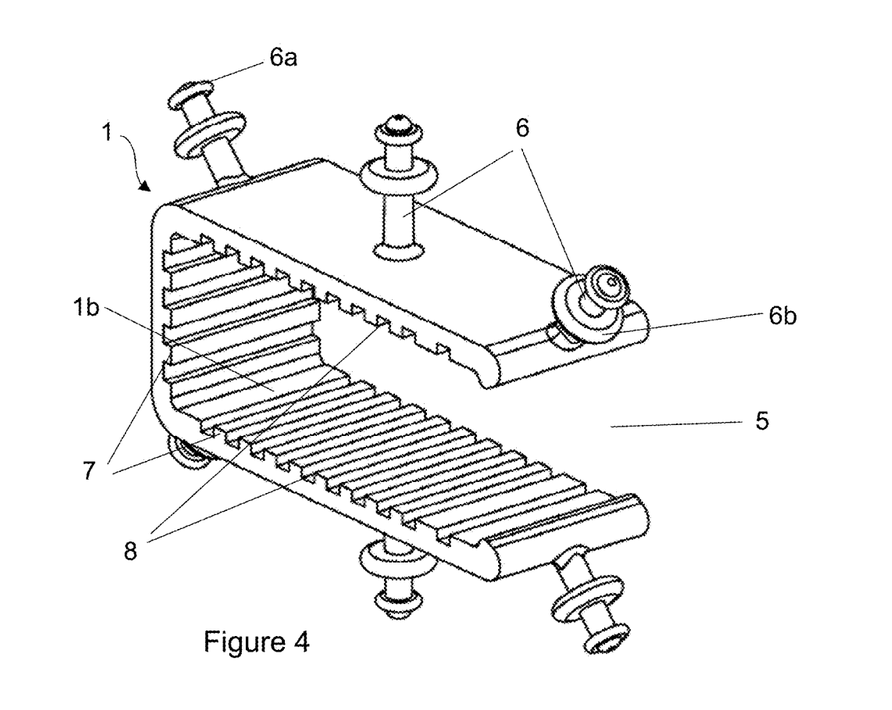
FIG. 4 is a second perspective view of the cable clip of FIG. 1 according to some embodiments.
Figure 5:
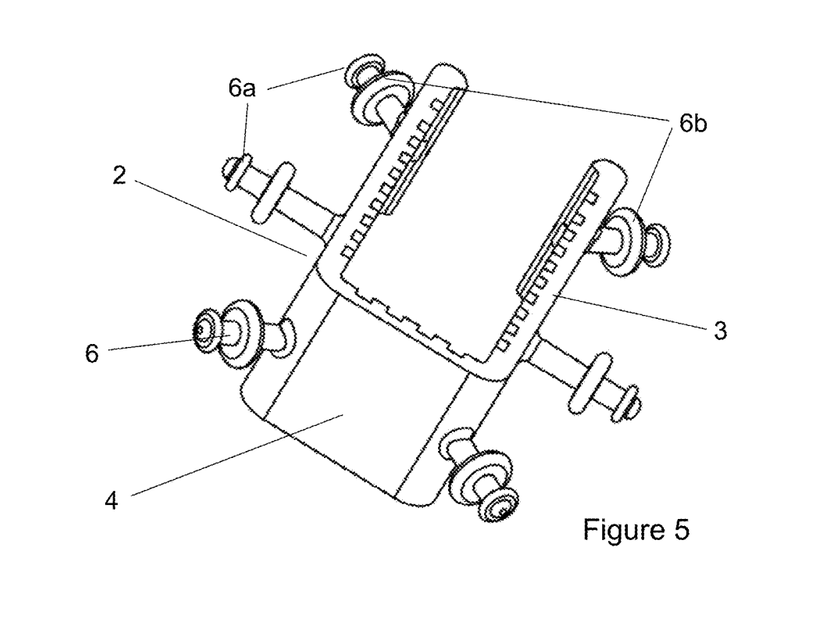
FIG. 5 is a third perspective view of the cable clip of FIG. 1 according to some embodiments.

The protruding end of each post 6 is rounded and has a radial flange 6a around it which forms a first cap for capturing any liquid which might drip or migrate from a mold placed around the clip as described below and otherwise run down the post 6. Each post 6 further includes a second flange 6b which is further down the post towards the main body of the clip 1 than the first flange 6a and protrudes further radially from the post 6 than the first flange 6a. The second flanges 6b serve to collect any drips, in particular release liquid, which might pass the first flange and run down the post and furthermore ensures that any such liquid which reaches the edge of the second flange drips away from the inside of the clip, does not migrate deeper down the post and hence away from a cable management formation which is enclosed therein.

The inner surface 1b of the clip 1 may be corrugated so as to be formed with a plurality of transversely extending ridges 7 interspaced by channels 8. During an encapsulation operation on a cable management formation enclosed within the clip 1, the channels 8 ensure that encapsulation sealant is able to penetrate between the inside of the clip 1 and the cable cores which is located within the clip and thereby ensures that the cables are encapsulated and avoids the formation of air pockets.

Figure 6:
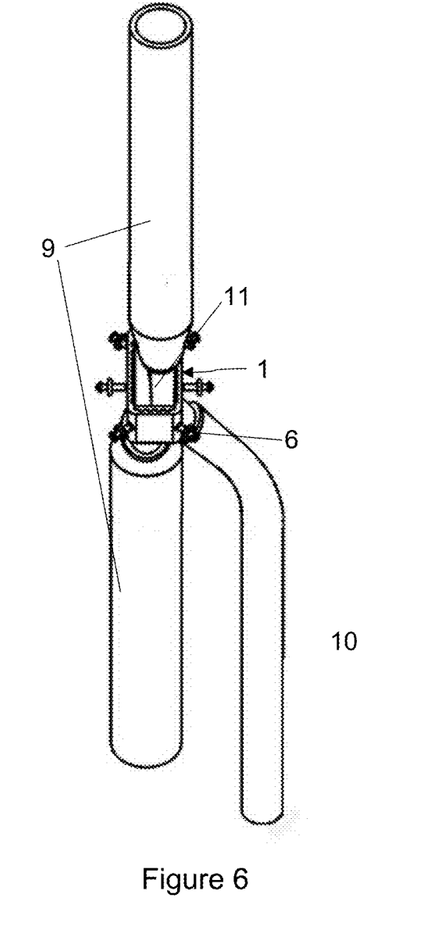
FIG. 6 is a first perspective view of the cable clip of FIG. 1 applied to a cable splice according to some embodiments.
Figure 7:
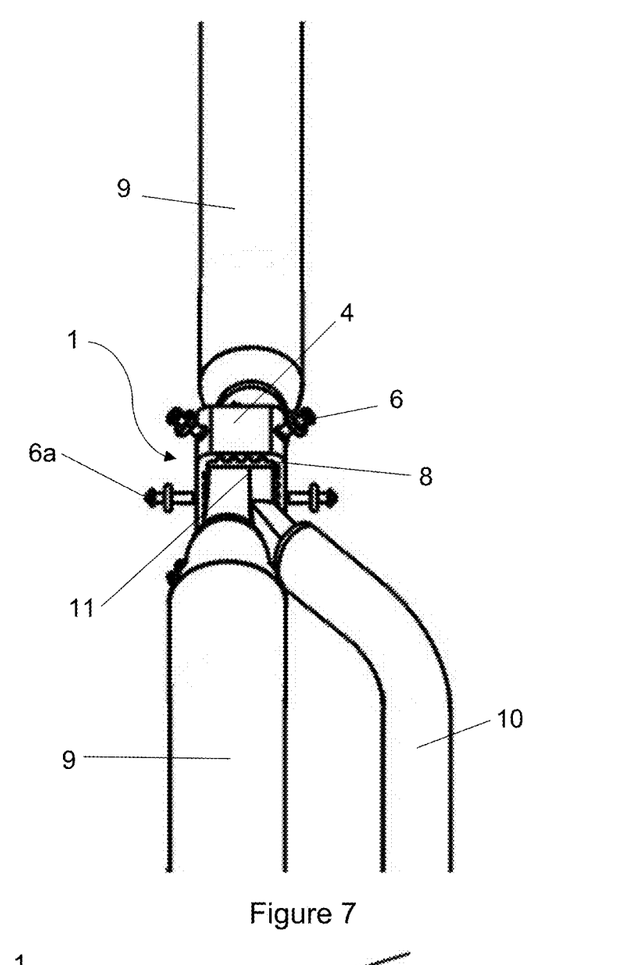
FIG. 7 is a top view of the clip and cable splice of FIG. 6 according to some embodiments.
Figure 8:
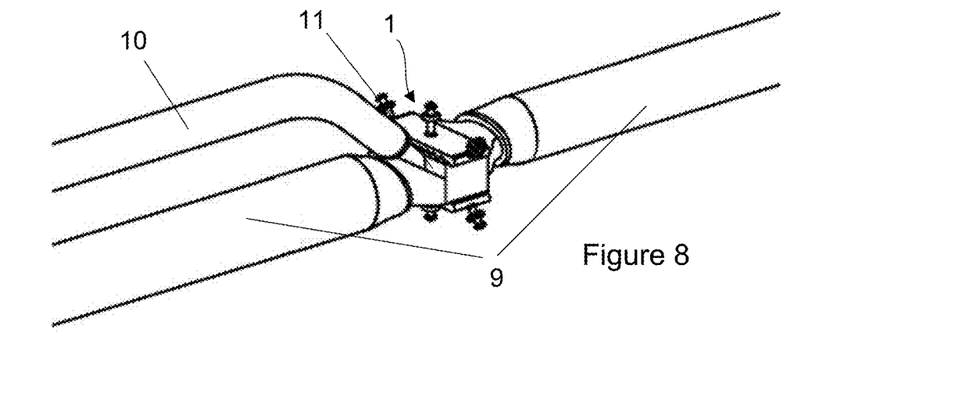
FIG. 8 is a second perspective view of the clip and cable splice of FIG. 6 according to some embodiments.
Figures 9, 10:
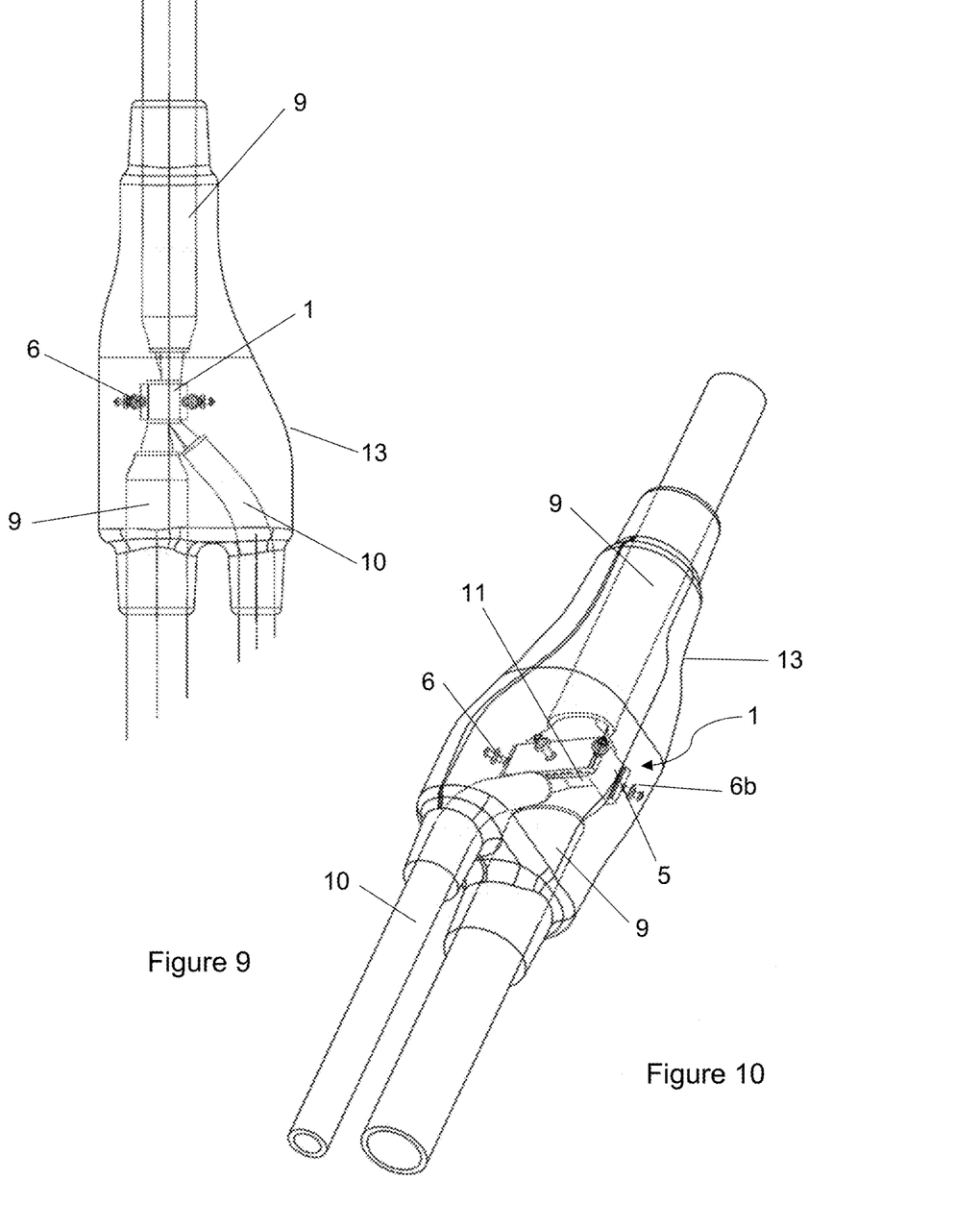
FIG. 9 is a side view of the clip and splice of FIG. 6 enclosed in an encapsulation sealant according to some embodiments.
FIG. 10 is a perspective view of the arrangement of FIG. 9 according to some embodiments.

Referring now to FIGS. 6 to 8, they show a pair of electrical cables 9, 10 which are joined together by a splice 11. Although the illustrated embodiment shows just two cables, it will be understood that application of the invention is not limited to 2 cables, and could be used with any number, including joining two loose ends to form a single cable which may have been joined. The splice is formed in a well-known manner by removing the insulating material from the region of the main cable 9 at which the secondary cable 10 is to be joined, as well as from the joining end of the secondary cable 10, and then electrically connecting the inner cores using a known method such as soldering, welding, brazing or crimping. Once the splice has been completed, the exposed inner cores undergo an encapsulation process to reinsulate them. The clip 1 of the present disclosure is engaged onto the splice 11 through the opening 5 so that the ends 6a of the posts 6 of the clip define an envelope which surrounds the splice 11 with a minimum space greater or equal to the minimum encapsulation required around the splice. Once the clip 1 has been fitted onto the splice 11, an encapsulation mold 13, shown in FIGS. 9 to 11, is enclosed around the splice 11 and clip 1 as well as the regions of the cables 9, 10 extending therefrom so as to form a region around the splice 11 and cables 9, 10 which will be encased in an encapsulation sealant 12.

Figure 11:
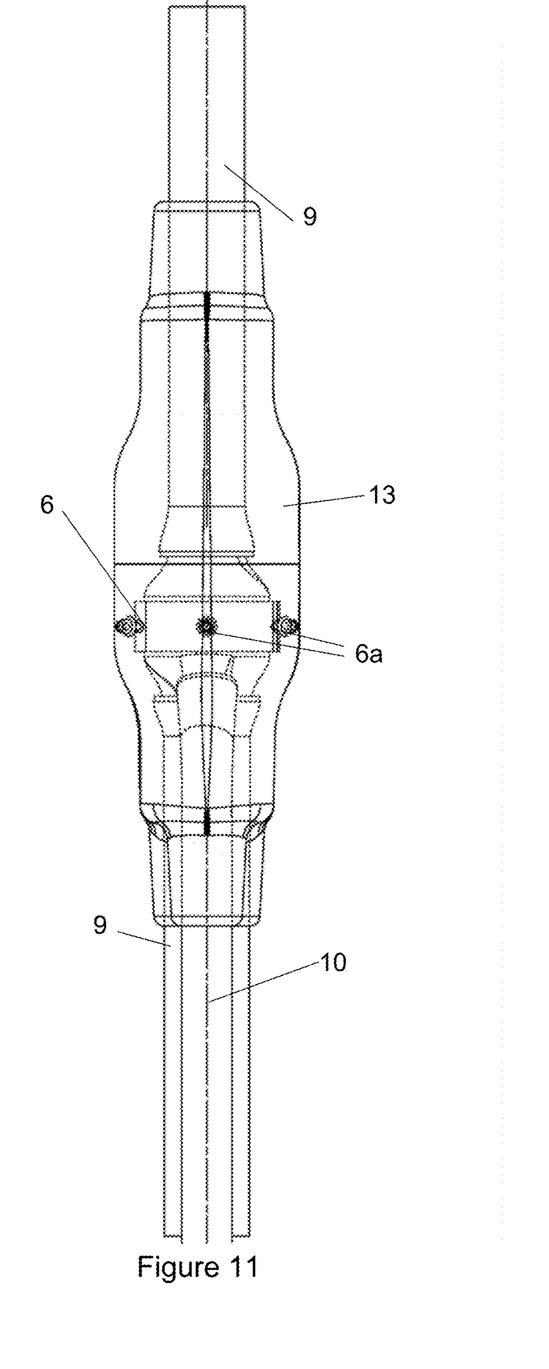
FIG. 11 is a top view of the arrangement of FIG. 9 according to some embodiments.

As can be seen in particular in FIG. 11, the protruding ends 6a of the posts interact with the inner surface of the mold 13 to ensure that the clip 1 and hence the splice 11 is kept at a minimum spacing or specified position from all sides of the mold 13. It can in particular be seen from FIG. 11 that the posts 6 operate to position the clip and hence the splice 11 centrally across the width of the mold 13 by engaging the inner surface of the mold on both sides, thereby ensuring the required space for formation of encapsulation sealant which ensuring the encapsulated splice 11 has as small a profile as possible.

To facilitate removal of the splice from the mold 13 after encapsulation, the inside of the mold 13 will typically be sprayed with a release agent which prevents the encapsulation sealant from bonding to the inside of the mold 13. As set out above, the flanges 6a, 6b on each post 6 serve the purpose of catching any release agent which drips onto the posts and diverts it away from the inside of the clip 1 and hence the splice, thereby avoiding the possibility that the release agent could prevent proper bonding of the encapsulation sealant to the spliced cable cores and clip.

Encapsulation of the splice is then conducted in a well-known manner by injecting encapsulation sealant into the mold. The channels 8 on the inner surface 1b of the clip 1 provide passages along which the sealant can pass to penetrate fully between the clip 1 and the spliced cores 11 and hence ensure penetration of the encapsulation sealant around the splice.

Figure 12:
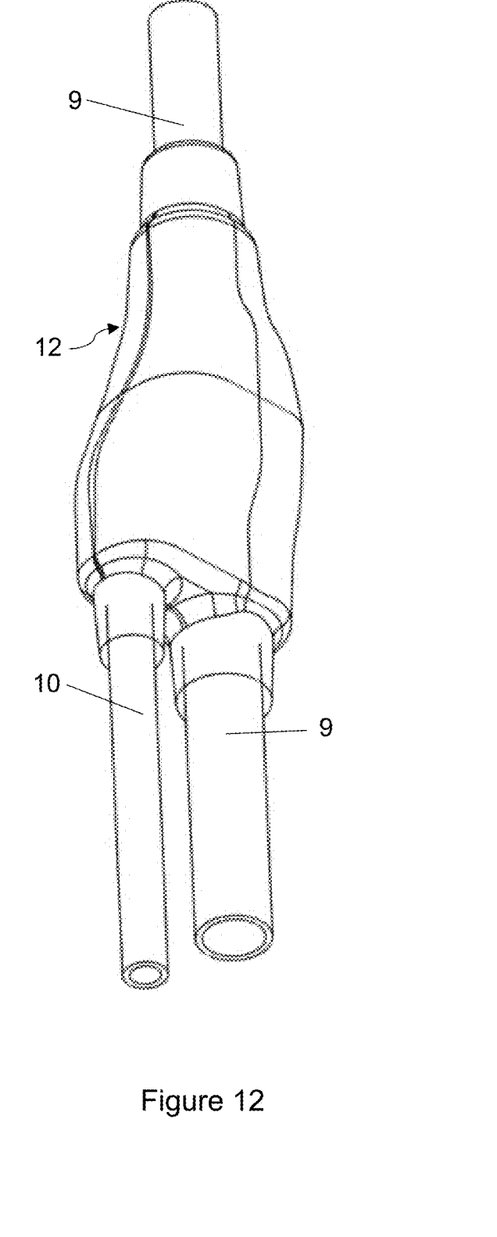
FIG. 12 is a perspective view of the arrangement of FIG. 9 encased in an encapsulation mold according to some embodiments.

Once the encapsulation sealant 12 has hardened, the mold 13 is opened and removed from the cables 9, 10, leaving the spliced joint 11 with the clip 1 still engaged there around fully encased in the encapsulation sealant 12 as shown in FIG. 12 and thereby fully re-insulated.

It will be understood that in the particular application which has been described for use with electrically conducting cables, the clip 1 would be formed of an insulating material to avoid conduction occurring from the clip itself to the outside of the encapsulation. However, the clip of the present disclosure may also be applied to cable management features of other cable types, and the clip 1 might then be formed of other materials appropriate to the particular application.

It will also be understood that other clip shapes may be possible with the arrangement of posts thereon then being configured to be appropriate for the particular shape of the clip.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A clip configured to engage an exposed conducting core of a cable during an encapsulation process, the clip comprising:
a body in the form of a loop having an inner surface and an outer surface and opposed ends which define an opening in the loop therebetween by means of which, in use, the clip can be engaged around the exposed conducting core, wherein the body comprises a post extending outwardly from the outer surface of the body, the post, in use, engaging with an inner surface of an encapsulation mold enclosed around the clip so as to maintain a spacing between the mold and the outer surface of the body and thereby ensure an encapsulating sealant is formed around the exposed conducting core of the cable during the encapsulation process and wherein the post includes a radial flange.

2. The clip according to claim 1, wherein the clip is made of an insulation material.

3. The clip according to claim 1, wherein the opening is sized to allow, in use, the clip to be engaged around the exposed conducting core without permanently deforming the body.

4. The clip according to claim 1, wherein the inner surface of the clip defines a plurality of channels which extend across a width of the clip.

5. The clip according to claim 1, wherein the clip comprises a plurality of the post extending outwardly from the outer surface of the body.

6. The clip according to claim 5, wherein the clip has a generally rectilinear C-shaped cross-sectional profile.

7. The clip according to claim 6, wherein plurality of the post comprises a post extending outwardly from at least one side of the rectilinear C-shaped cross-sectional profile.

8. The clip according to claim 6, wherein plurality of the post comprises a post extending outwardly from a middle of each long side of the rectilinear C-shaped cross-sectional profile.

9. The clip according to claim 8, wherein each post which extends outwardly from the middle of each long side of the profile is longer than any corner posts.

10. The clip according to claim 6, wherein the plurality of the post comprises an outwardly extending post provided on each corner of the rectilinear C-shaped cross-sectional profile.

11. The clip according to claim 1, wherein the radial flange is formed part way along a length of each post, in particularly proximate a middle of each post.

12. The clip according to claim 11, wherein the radial flange is formed proximate the middle of each post.

13. The cable clip according to claim 1, wherein a plurality of the radial flange comprises a radial flange formed on each post proximate an end of the post located remote from the body of the cable clip.

14. A method of encapsulating a cable management feature of an exposed conducting core of a cable, comprising:
engaging a clip around an exposed cable management feature;
enclosing an encapsulation mold around the clip;
inserting encapsulation sealant into the mold;
allowing the encapsulation sealant to cure; and
removing the mold from around the encapsulated clip and cable management feature, wherein the clip has a body in the form of a loop having an inner surface and an outer surface and opposed ends which define an opening in the loop therebetween by means of which, in use, the clip can be engaged around the exposed conducting core, wherein the body comprises a post extending outwardly from the outer surface of the body, and wherein the post includes a radial flange.

15. The method according to claim 14, further comprising engaging the post with an inner surface of the encapsulation mold enclosed around the clip so as to maintain a spacing between the mold and the outer surface of the body.

* * * * *